United States Patent
Minegishi et al.

(10) Patent No.: US 6,378,206 B1
(45) Date of Patent: Apr. 30, 2002

(54) METHOD OF FABRICATING PIN RETAINING RING FOR INTERNAL GEAR, INTERNAL MESHING PLANETARY GEAR STRUCTURE, AND HYDRAULIC MOTOR PUMP

(75) Inventors: Kiyoji Minegishi, Aichi; Tetsuzo Ishikawa, Ohbu, both of (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/582,197
(22) PCT Filed: Oct. 28, 1999
(86) PCT No.: PCT/JP99/05980
 § 371 Date: Jun. 29, 2000
 § 102(e) Date: Jun. 29, 2000
(87) PCT Pub. No.: WO00/25974
 PCT Pub. Date: May 11, 2000

(30) Foreign Application Priority Data

Oct. 29, 1998 (JP) ............................ 10-308240
Oct. 29, 1998 (JP) ............................ 10-308241

(51) Int. Cl.[7] ................. B21D 53/28; B21C 37/30; F01C 1/02
(52) U.S. Cl. ................. 29/893.3; 29/90.6; 418/61.3
(58) Field of Search ............... 29/893.3, 90.6; 418/61.3

(56) References Cited

U.S. PATENT DOCUMENTS 5,972,132 A  * 10/1999  Cadle ...................... 72/208

FOREIGN PATENT DOCUMENTS

| JP | 56-104853 | 1/1955 |
| JP | 59-115120 | 7/1984 |
| JP | 3-121719 | 5/1991 |

\* cited by examiner

Primary Examiner—P. W. Echols
(74) Attorney, Agent, or Firm—Arent Fox Kintner Plotkin & Kahn, PLLC

(57) ABSTRACT

To improve the sliding rotations of pins within pin (roller) retaining holes 113a. A method of fabricating a pin (roller) retaining ring in an internal meshing gear mechanism, the mechanism having an internal gear 20 and external gears 5a, 5b put into internal mesh with the internal gear, the internal gear consisting of a pin (roller) retaining ring 110 having half-round pin (roller) retaining holes in its inner periphery and pins (rollers) 11 rotatably fitted to the respective pin retaining holes, is provided. Here, before the bore diameter φDA of a pin retaining ring base material 151 is machined to a finished diameter, the pin retaining holes 113a are cut as full round holes into the ring base material. The inner surfaces of the pin retaining holes 113a are finished by roller burnishing, and then the bore diameter of the pin retaining ring is expanded to the finished diameter to obtain the pin retaining ring having the half-round pin retaining holes. This realizes the lubrication between the pin retaining holes and the pins in a state close to fluid lubrication.

10 Claims, 17 Drawing Sheets

METHOD OF FABRICATING PIN RETAINING RING FOR INTERNAL GEAR, INTERNAL MESHING PLANETARY GEAR STRUCTURE, AND HYDRAULIC MOTOR PUMP

TECHNICAL FIELD

The invention relates to a method of fabricating an internal-gear pin retaining ring for retaining pins (conceptually including rollers of great diameter) in an internal meshing gear mechanism having an internal gear, whose teeth are constituted by the pins, and an external gear put into internal mesh with the internal gear.

The invention also relates to internal meshing planetary gearing or a hydraulic motor pump fabricated through the use of this fabrication method.

BACKGROUND ART

Those internal meshing gear structures heretofore known widely include a double row type internal meshing planetary gear structure comprising: a first shaft; eccentric bodies which are rotated by the rotation of the first shaft; a plurality of external gears attached to the eccentric bodies via bearings so as to be capable of eccentric rotations; an internal gear which comes into internal mesh with the external gears via its inward teeth constituted by outer pins; and a second shaft coupled to the external gears via inner pins which extract only the rotational components of the external gears.

FIGS. 17 and 18 show a conventional example of this structure. In this conventional example, the above-described structure is applied to "reduction gears" by making the first shaft an input shaft, making the second shaft an output shaft, and fixing the internal gear.

On the input shaft 1 are fitted eccentric bodies 3a and 3b with a predetermined phase difference therebetween (180°, in this example). Each of the eccentric bodies 3a and 3b is off the center of the input shaft 1 (center O1) by an eccentricity e (center O2). Two external gears 5a and 5b are attached in double rows to the respective eccentric bodies 3a and 3b via bearings 4a and 4b. These external gears 5a and 5b have a plurality of inner roller holes 6a and 6b through which inner pins 7 and inner rollers 8 are inserted.

The external gears are provided in two (in double rows) mainly for the sake of enhancing the transmission capacity, maintaining the strength, and keeping the rotational balance.

On the outer peripheries of the external gears 5a and 5b mentioned above are provided outward teeth 9 of trochoidal tooth profile or circular arc tooth profile. The outward teeth 9 are put into internal mesh with the internal gear which is fixed to a casing 12. The internal gear 20 consists of a pin retaining ring 10 and outer pins 11. The pin retaining ring 10 has a plurality of axially-extending pin retaining holes 13 of half-round shape in its inner periphery. The outer pins 11 are rotatably fitted to the pin retaining holes 13 with some play, and form circular arc teeth with the portions exposed from the pin retaining holes 13.

The inner pins 7 penetrating through the external gears 5a and 5b mentioned above are firmly fixed or fitted to a flange portion around the output shaft 2.

One rotation of the input shaft 1 makes one rotation of the eccentric bodies 3a and 3b. This one rotation of the eccentric bodies 3a and 3b urges the external gears 5a and 5b to oscillate and rotate about the input shaft 1. However, since their rotations on the axis are restricted by the internal gear 20, the external gears 5a and 5b almost exclusively make oscillations while internally meshing with this internal gear 20.

Now, given that the number of teeth on the external gears 5a and 5b is N and the number of teeth on the internal gear 20 is N+1, the difference between the numbers of teeth is 1. Accordingly, each rotation of the input shaft 1 shifts (rotates) the external gears 5a and 5b with respect to the internal gear 20 fixed to the casing 12, by the amount corresponding to one tooth. This means that one rotation of the input shaft 1 is reduced to $-1/N$ rotations of the external gears 5a and 5b.

The oscillating components in the rotations of the external gears 5a, 5b are absorbed by the clearances between the inner roller holes 6a, 6b and the inner pins 7 (inner rollers 8). Thus, only the rotational components thereof are transmitted via the inner pins 7 to the output shaft 2.

This consequently achieves speed reduction of $-1/N$ in reduction ratio (the negative sign represents a reverse rotation).

Incidentally, this internal meshing planetary gear structure is now being applied to various kinds of reduction gears or step-up gears. For example, while the first shaft and the second shaft make the input shaft and the output shaft and the internal gear is fixed in the structure described above, reduction gears can also be constructed by making the first shaft the input shaft, making the internal gear the output shaft, and fixing the second shaft. Moreover, "step-up gears" can be constructed by reversing the input and output shafts in these structures.

By the way, in order to miniaturize the internal meshing planetary gear mechanism of this type and enhance its load capacity, the internal gear 20, among those parts having meshing portions or sliding portions, must be made to have high strength properties. In addition, the external gears 5a, 5b, the outer pins 11, the inner rollers 8, the inner pins 7, the bearings 4a, 4b, and the eccentric bodies 3a, 3b must be made to have both high strength properties and high hardness properties. Therefore, the parts mentioned above are usually fabricated of metal materials having such properties.

The metal materials having high strength properties and high hardness properties, however, commonly have relatively greater coefficients of friction. Therefore, the sliding contact surfaces using these metal materials require oil or grease lubrication. Since the lubrications are achieved by forming an oil film on the contact surfaces, clearances therefor must be formed between the mutual contact surfaces in the transmission mechanism. These clearances are also necessary to absorb elastic deformations produced in power transmission and machining errors of the component parts.

Such clearances can cause play and backlash of the entire mechanism, thereby precluding rotations on one side from taking the form of rotations on the other side immediately. Such a delay in response will hereinafter be referred to as angle backlash. The angle backlash like this can cause a drop in control accuracy when the transmission mechanism is used as a control mechanism. Elimination of such angle backlash requires that the clearances be reduced, which unfavorably lowers the lubrication performance in terms of lubricating-oil maintenance. Consequently, the reduction of angle backlash and the improvement of lubrication remain contradictory to each other. In particular, control mechanisms prefer smaller friction on their contact surfaces since they repeat starts and stops frequently, while lubrication is an inevitable technical matter in reducing friction. Eventually, the reduction of angle backlash would be a technical matter of great difficulty.

In the meantime, it is also publicly known to form chemical conversion coating, such as phosphatic coating, on the sliding portions to lower the coefficient of friction on the sliding portions. This chemical conversion coating itself does not posses a low coefficient of friction, but retains a large amount of lubricating oil in its minute asperities to achieve the low coefficient of friction.

In this view, the chemical conversion coating mentioned above may be applied to the meshing portions and the sliding contact surfaces in a transmission mechanism. The chemical conversion coating itself, however, is easy to wear, and a problem exists because the coating comes off in a short time.

With the objective of providing a structure and a fabrication method of a contact surface for reducing the clearances between the contact surfaces in a transmission unit and allowing long-term maintenance of lubricating oil, the present applicants have proposed, in Japanese Patent Application No. Sho 60-271649 (Japanese Patent Publication No. Hei 2-36825, Japanese Patent No. 1623717), a contact surface which comprises: a contact surface having irregular surfaces formed along and across the tooth trace direction of the grinding texture on a tooth; and chemical conversion coating formed on the contact surface with a thickness smaller than the height of the irregularities.

Here, as an example of the internal meshing planetary gear structure of this type in use, a publicly-known trochoidal type hydraulic motor will be described with reference to FIGS. 22 and 23.

This trochoidal hydraulic motor consists of three parts, i.e., an output mechanism part A, a displacement: mechanism part B, and a valve mechanism part C. The output mechanism part A has an output shaft 502 rotatably supported by bearings 501. The displacement mechanism part B has an internal gear 503, and an external gear 504 coming into internal mesh therewith. These gears form volume change rooms 511 between their teeth. The valve mechanism part C has a valve plate 505 which rotates to switch hydraulic oil channels. The valve mechanism part C functions to distribute and supply the pump-supplied hydraulic oil to the volume change rooms 511 in the displacement mechanism part B as well as to recover the return-side oil from the volume change rooms 511.

The transmission of rotational power between the output mechanism part A and the displacement mechanism part B is carried out by a first transmission shaft 506. The transmission of rotational power between the displacement mechanism part B and the valve mechanism part C is carried out by a second transmission shaft 507. For that purpose, both ends of the first transmission shaft 506 are engaged with the output shaft 502 in the output mechanism part A and the external gear 504 in the displacement mechanism part B via loose splines 561 and 562, respectively. In addition, both ends of the second transmission shaft 507 are engaged with the external gear 504 in the displacement mechanism part B and the valve plate 505 in the valve mechanism part C via loose splines 571 and 572, respectively.

Here, the first transmission shaft 506 functions to remove the oscillating components from the oscillating rotations that the external gear 504 makes in the displacement mechanism part B, so that only the rotational components are taken out to the output shaft 502 as rotational power. Then, the second transmission shaft 507 functions to remove the oscillating components from the oscillating rotations that the external gear 504 makes in the displacement mechanism part B, so that only the rotational components are taken out to the valve plate 505 as rotational power.

The internal gear 503, or one of the components of the displacement mechanism part B, comprises a roller retaining ring 532 and rollers 533. The roller retaining ring 532 has a plurality of axially-extending roller retaining holes of half-round shape 531 in its inner periphery. The rollers 533 are fitted to the respective roller retaining holes 531, and form circular arc teeth with the portions exposed from the roller retaining holes 531. Besides, the external gear 504 adopts a trochoidal tooth profile for its teeth. The number of teeth on the external gear 504 is set to be one fewer than the number of teeth on the internal gear 503. Furthermore, the center 04 of the external gear 504 is off the center O3 of the internal gear 503. With the contact points of their teeth, the external gear 540 and the internal gear 503 form the volume change rooms 551 of the same number as the number of teeth on the internal gear 503 (seven, in the case of the shown example).

Next, description will be given of the functions.

When hydraulic oil is selectively fed through the valve mechanism part C to predetermined volume change rooms 551 in the displacement mechanism part B, the volume change rooms 551 successively change in volume (expands and contracts) so that the external gear 504 makes oscillating rotations about the center O3 of the internal gear 503. This rotational power is transmitted from the external gear 504 through the first transmission shaft 506 to the output shaft 502, and only the rotational components thereof without any eccentric movement are taken out from the output shaft 502 to exterior.

Parenthetically, when using this motor as a pump, rotational power is applied to the output shaft 502 in contrast to the foregoing, so that the volume change rooms 511 change in volume to draw the hydraulic oil out to the exterior through the valve plate 505.

In the trochoidal type hydraulic motor (pump) described above, the internal gear 503 and the external gear 504 come into internal mesh with each other so as to achieve the functions of transmitting power and sectioning the volume change rooms 511. As long as the function of power transmission is concerned alone, the internal mesh has only to be established between the individual teeth of the internal gear 503 and part of the teeth of the external gear 504. Therefore, for example, the tooth profile curve of the external gear 504 can be modified so that only the concave portions of the teeth on the external gear 504 come into mesh with the teeth of the internal gear 503 for strength maintenance and friction reduction. In a motor/pump use, however, the individual teeth need to mesh all the time because the function of strictly sectioning the volume change rooms 51 is also required.

Thus, the contact portions between the tooth profiles are large in number. Accordingly, in order to achieve smaller configuration and higher pressure, the external gear, among those component parts having meshing portions or sliding portions, must be made to have high strength properties, and the internal gear be made to have high hardness properties. On this account, both the external gear and the internal gear are usually fabricated of metal materials having relatively higher coefficients of friction. This, however, contributes to a drop in power conversion efficiency and a temperature rise of the fluid in use.

In consideration of this, it has been proposed to line the tooth surfaces with low-friction material or apply electroless coating to the tooth surfaces so as to lower the coefficients of friction. However, the problem of friction, in fact, has not been fully solved yet.

Meanwhile, in this field of utilization as a hydraulic motor pump, it is also known that chemical conversion coating, such as phosphatic coating, is applied to the sliding portions of the machine to lower the coefficients of friction on the sliding portions. As described before, this chemical conversion coating itself does not posses a low coefficient of friction, but retains a large amount of lubricating oil in its minute asperities to achieve the low coefficient of friction.

The publicly-known chemical conversion coating mentioned above can also be applied to the tooth meshing portions and the sliding contact portions in a trochoidal type hydraulic motor. However, the chemical conversion coating itself is quite easy to wear, so that a problem exists since the coating comes off in a short time.

On this account, in the field of trochoidal type hydraulic motor pumps, a method as described above, of forming a tooth contact surface comprising a contact surface having irregular surfaces formed along and across the tooth trace direction of the grinding texture on a tooth, and chemical conversion coating formed on the contact surface with a thickness smaller than the height of the irregularities can be used with the objective of providing contact surfaces which can reduce the coefficient of friction on the tooth contact surfaces between the external gear and the internal gear as well as achieve the reduction of power losses.

Nevertheless, in any of these publicly-known methods, attention was paid to the achievement of high efficiency and long life by reducing the coefficients of friction on the tooth contact surfaces between the external gear and the internal gear. Therefore, none of them had the concept of improving (fluid-lubricating) the sliding rotations of the pins with respect to the pin retaining holes.

Accordingly, the pin retaining holes 13 (roller retaining holes 531) heretofore were subjected only to broaching or gear shaping, or if high accuracy was particularly required, to bore grinding by using a small-diameter grindstone 40 (540) as shown in FIG. 19 (FIG. 24).

To be more specific, the cutting by a conventionally publicly-known broach applied cuts (shearing of material) all the way to the final step of the machining. Therefore, as shown in FIG. 20 (FIG. 25), the pin retaining holes 13 (roller retaining holes 531) were at best not smaller than approximately 5–10 $\mu$m in circumferential roughness, depending on the state of wear of the broach and the sharpness according to the machining conditions. Similarly, even in the gear shaping, the pin retaining holes 13 (roller retaining holes 531) had a circumferential roughness not smaller than approximately 1–2 $\mu$m, as shown in FIG. 21 (FIG. 26). Moreover, even when these machined articles were subjected to the grinding as shown in FIG. 19 (FIG. 24), the pin retaining holes 13 (roller retaining holes 531) had a circumferential roughness not smaller than 1–2 $\mu$m since the final step of the machining was still shearing of material.

Accordingly, as the external gears 5a and 5b (504) meshed with the internal gear 20 (503), the outer pins 11 (rollers 533) made sliding rotations in the pin retaining holes 13 (roller retaining holes 531) with great frictional losses, which contributed to low efficiency particularly on startups, shorter parts life, increased noise, and the like.

In view of the foregoing, it is an essential object of the present invention to provide a method of fabricating an internal-gear pin retaining ring of an internal meshing gear mechanism, capable of improving the sliding rotations of the pins (outer pins or rollers) in the pin (roller) retaining holes and reducing the friction losses produced between the pins and the pin retaining holes to achieve improved efficiency, longer life, and lower noise.

DISCLOSURE OF THE INVENTION

With consideration given to the power transmission characteristics between the external gear(s) and the internal gear, and with attention directed to the fact that most of the meshing between the teeth of the external gear(s) and the teeth (pins, rollers) of the internal gear are of rolling contact while the pins (outer pins, rollers) and the pin retaining holes (roller retaining holes) make sliding contact therebetween, the present invention is to bring the lubrication between the pins and the pin retaining holes close to fluid lubrication so as to realize the higher efficiency, the longer life, and the lower noise at lower costs.

More specifically, a method of fabricating a pin retaining ring for an internal gear in an internal meshing gear mechanism is provided, wherein the internal meshing gear mechanism having the internal gear and an external gear is placed into internal mesh with the internal gear, the internal gear consisting of the pin retaining ring having a plurality of axially-extending pin retaining holes of half-round shape in its inner periphery and pins rotatably fitted to the respective pin retaining holes, the pins forming circular arc teeth with the portions exposed from the pin retaining holes, the external gear having teeth corresponding to the circular arc teeth. Here, the method comprises the steps of cutting the pin retaining holes, and plastically finishing the inner surfaces of the pin retaining holes by roller burnishing.

In this connection, the roller burnishing is a method for working the inner surfaces of the pin retaining holes into smooth finished surfaces by pressing compaction rollers having a smooth surface against the inner surfaces of the pin retaining holes and rotating the same so that the inner surfaces of the pin retaining holes undergo plastic deformation and work hardening. List The application of this roller burnishing makes it possible to reduce the height of the asperities on the inner surfaces of the pin retaining holes to less than 0.5 $\mu$m, as well as to densify the metallographic structure of the surfaces of the pin retaining holes. This consequently achieves higher efficiency and longer life.

Alternatively, for example, it may be adopted a method in which a blanking tool used in the broaching is provided with a mirror finished potion of somewhat greater diameter at the final end thereof, so that the inner surface of the pin retaining holes are crushed through plastic deformation using the mirror finished potion of somewhat greater diameter of the blanking tool. However, it has been confirmed that this method cannot offer a sufficient effect because the inner surfaces is crushed only in the axial directions when the blanking tool is moved axially. In the present invention, favorable mirror surfaces are obtained since the mirror surfaces are finished by roller burnishing after the cutting.

By the way, when the roller burnishing is employed to finish "half-round" inner surfaces in finishing the inner surfaces of the pin retaining holes through plastic deformation, a problem exists because this machining method is different from cutting in having extreme difficulty in machining the half-round inner surfaces with precise centering. For this reason, while smoothness can be secured in terms of surface roughness, it is still impossible to finish the half circles with precision (in dimension) required for the pin retaining holes in an internal meshing gear mechanism of this type.

Then, a method of fabricating a pin retaining ring for an internal gear in an internal meshing gear mechanism is provided, wherein the internal meshing gear mechanism having the internal gear and an external gear is placed into internal mesh with the internal gear, the internal gear consisting of the pin retaining ring having a plurality of axially-extending pin retaining holes of half-round shape in its inner periphery and pins rotatably fitted to the respective pin retaining holes, the pins forming circular arc teeth with the portions exposed from the pin retaining holes, the external gear having teeth corresponding to the circular arc teeth. Here, the method comprises the steps of: cutting the pin retaining holes as full round holes into a pin retaining ring base material having such a bore diameter (including zero) as to include the pin retaining holes in the form of full round holes; after the cutting step, plastically finishing the inner surfaces of the respective pin retaining holes by roller burnishing; and after the plastic finishing step, expanding the bore diameter of the pin retaining ring base material to a finished diameter so that the respective pin retaining holes having their inner surfaces finished as the full round holes are opened at the portions closer to the ring inner periphery to form the pin retaining holes of half-round shape.

A method of fabricating a pin retaining ring for an internal gear in an internal meshing gear mechanism is provided, wherein the internal meshing gear mechanism having the internal gear and an external gear is placed into internal mesh with the internal gear, the internal gear consisting of the pin retaining ring having a plurality of axially-extending pin retaining holes of half-round shape in its inner periphery and pins rotatably fitted to the respective pin retaining holes, the pins forming circular arc teeth with the portions exposed from the pin retaining holes, the external gear having teeth corresponding to the circular arc teeth. Here, the method comprises the steps of: cutting opening pin retaining holes of half-round shape into the inner periphery of the pin retaining ring; after the cutting step, fitting a circular guide having half-round holes corresponding to the pin retaining holes formed in its outer periphery to the inner periphery of the pin retaining ring so that the half-round holes formed in the outer periphery of the guide and the half-round pin retaining holes in the pin retaining ring constitute full round holes; after the guide fitting step, plastically finishing by roller burnishing the inner surfaces of the full round holes formed by the coalescence of the guide and the pin retaining ring; and after the plastic finishing step, detaching the guide from the pin retaining ring.

The above-described methods may each also include the additional step of applying chemical conversion coating to the inner surfaces of the pin retaining holes after the completion of the plastic finishing to the pin retaining holes.

The above-described fabrication methods may also be used to fabricate an internal gear in a hydraulic motor pump. Furthermore, it is within the scope of this invention that internal meshing planetary gearing and a hydraulic motor pump have an internal gear that is manufactured according to the above-described fabrication methods.

According to the present invention, a fluid lubrication state can be created between the pin retaining holes and the pins to improve the sliding rotations of the pins. In particular, assuming an identical oil temperature, the pins and the pin retaining holes can secure oil films therebetween up to higher loads. Assuming an identical load, the pins and the pin retaining holes can secure oil films therebetween up to higher temperatures. Therefore, the losses in the sliding portions can be made smaller to enhance both the startup efficiency from a stopped state and the dynamic efficiency in an operating state. In addition, the enhanced efficiencies decrease a rise in temperature, thereby allowing miniaturization of reduction gears and the like. Moreover, the improved lubrication can extend parts life and reduce noise, as well as decrease angle backlash. Besides, the simple configuration of improving the pin retaining holes in finished precision can achieve output maximization while keeping the compactness. Furthermore, application of chemical conversion coating allows the prevention of initial burning to be compatible with the securement of fluid lubrication through the improvement in surface roughness.

BEST MODE FOR CARRYING OUT THE INVENTION

Hereinafter, the embodiments of the present invention will be described with reference to the accompanying drawings.

Figure 17:
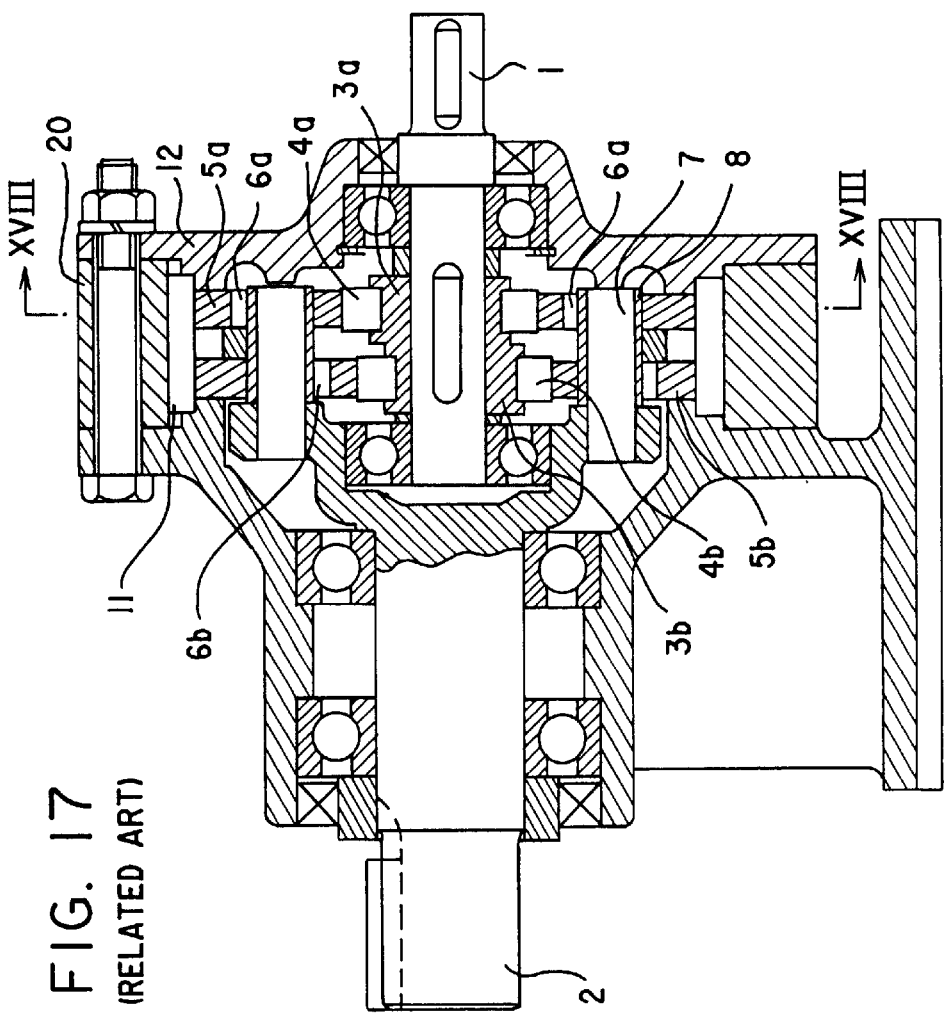
FIG. 17 is a-sectional view of an internal meshing planetary gear mechanism shown as a conventional example of the internal meshing gear mechanism in question.
Figure 18:
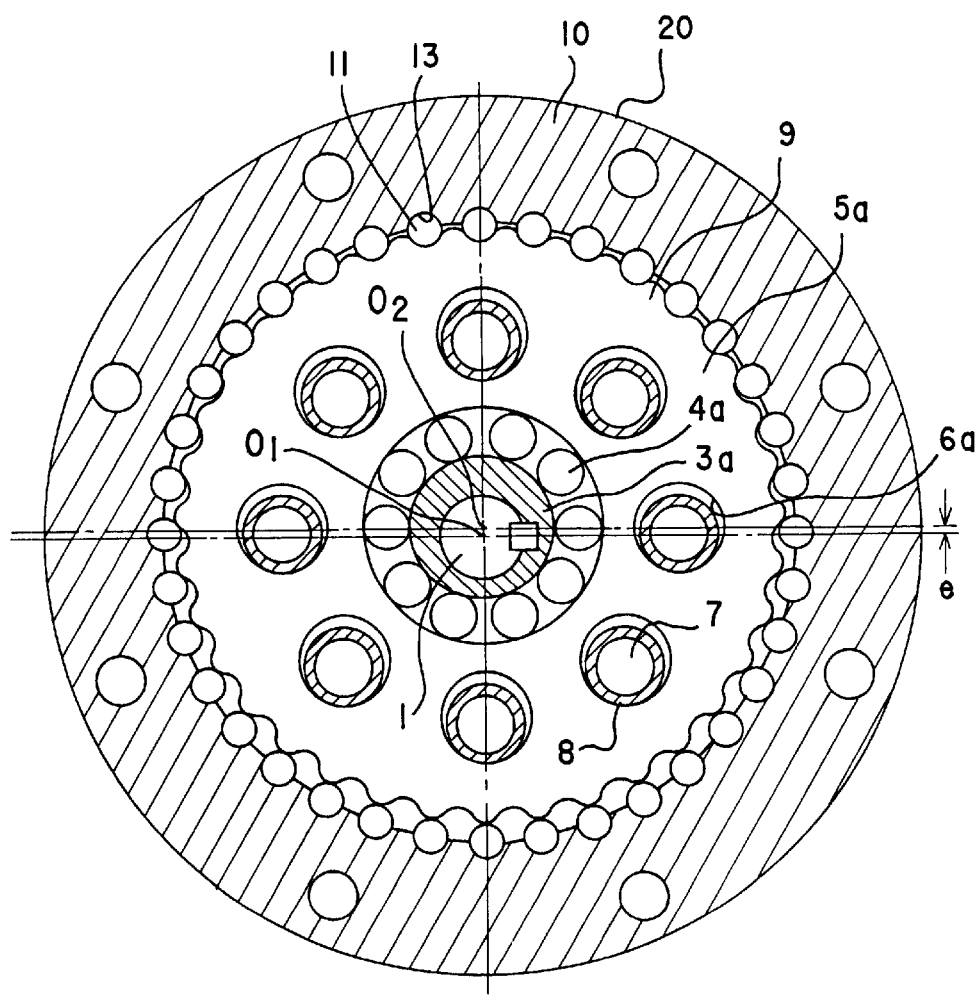
FIG. 18 is a sectional view taken along the arrowed line XVIII—XVIII of FIG. 17.
Figure 19:
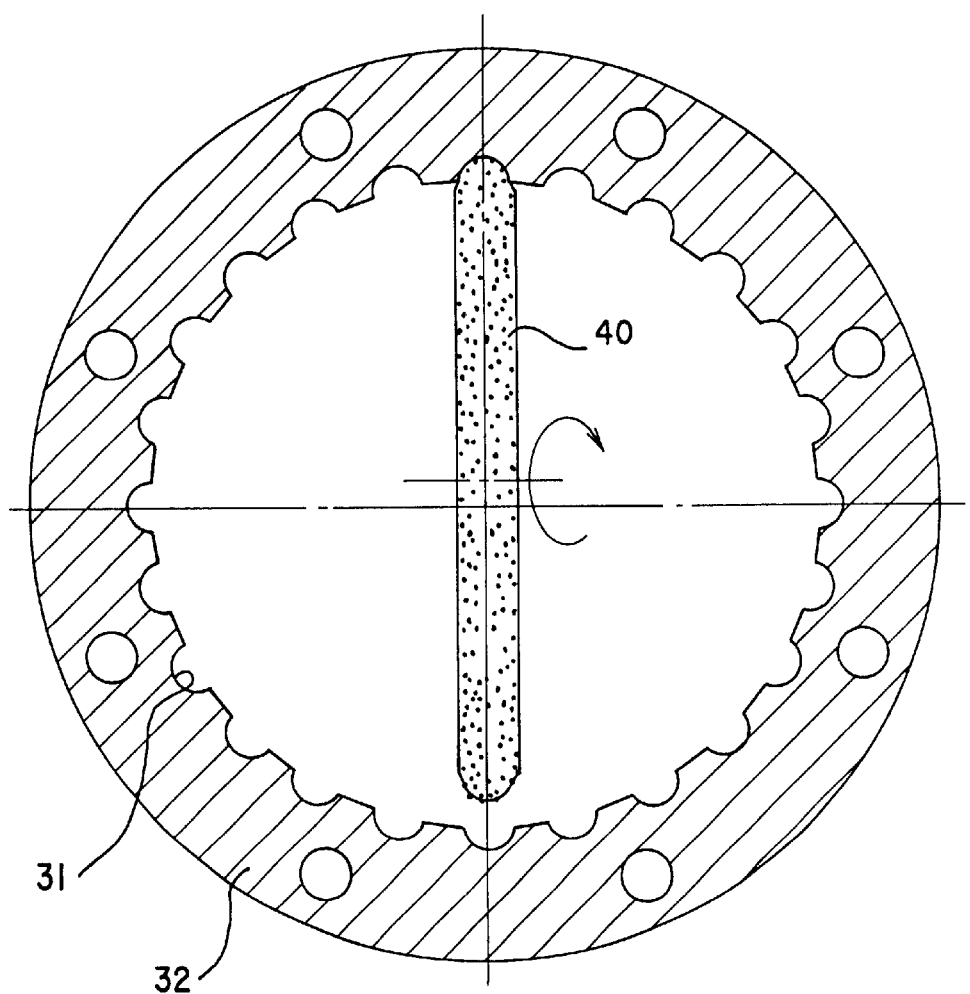
FIG. 19 is an explanatory diagram of a conventional method for machining pin retaining holes.
Figure 20:
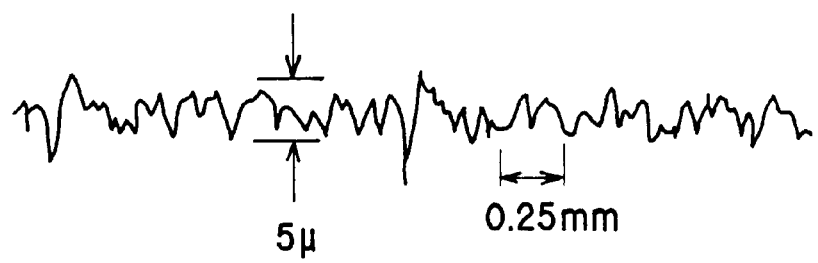
FIG. 20 is a diagram showing the circumferential surface roughness of a conventional pin retaining hole after broaching.
Figure 21:
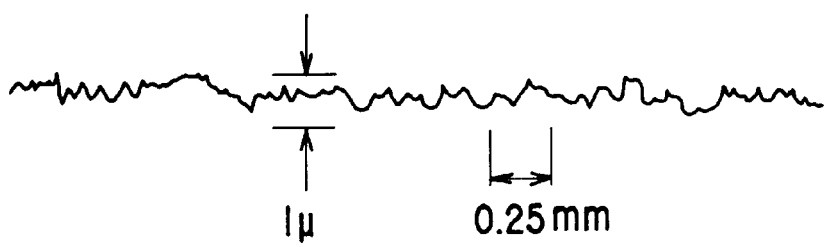
FIG. 21 is a diagram showing the circumferential surface roughness of a conventional pin retaining hole after grinding.

In appearance, the internal meshing planetary gear mechanism of the first embodiment has almost the same configuration as that shown in FIGS. 17 and 18, except in the detailed configuration of the pin retaining ring 10 constituting the internal gear 20 and in the method of fabricating the same. Thus, the description of the first embodiment will first be directed to the method of fabricating a pin retaining ring 110 (the pin retaining ring of the present embodiment is designated by the reference numeral having the lower two digits identical to the reference numeral of the conventional pin retaining ring shown in FIGS. 17 and 18).

Generally speaking, in an internal meshing planetary gear mechanism of this type, the meshing portions and the sliding contact surfaces need to be made of high strength members with high precision. Therefore, the pin retaining ring 110 of the internal gear 20 is generally fabricated of gray iron defined in JIS G5501, spheroidal graphite cast iron defined in JIS G5502, or aluminum alloy die-cast defined in JIS H5302.

The fabrication method of the first embodiment will be described in conjunction with FIGS. 1–5.

Figure 1:
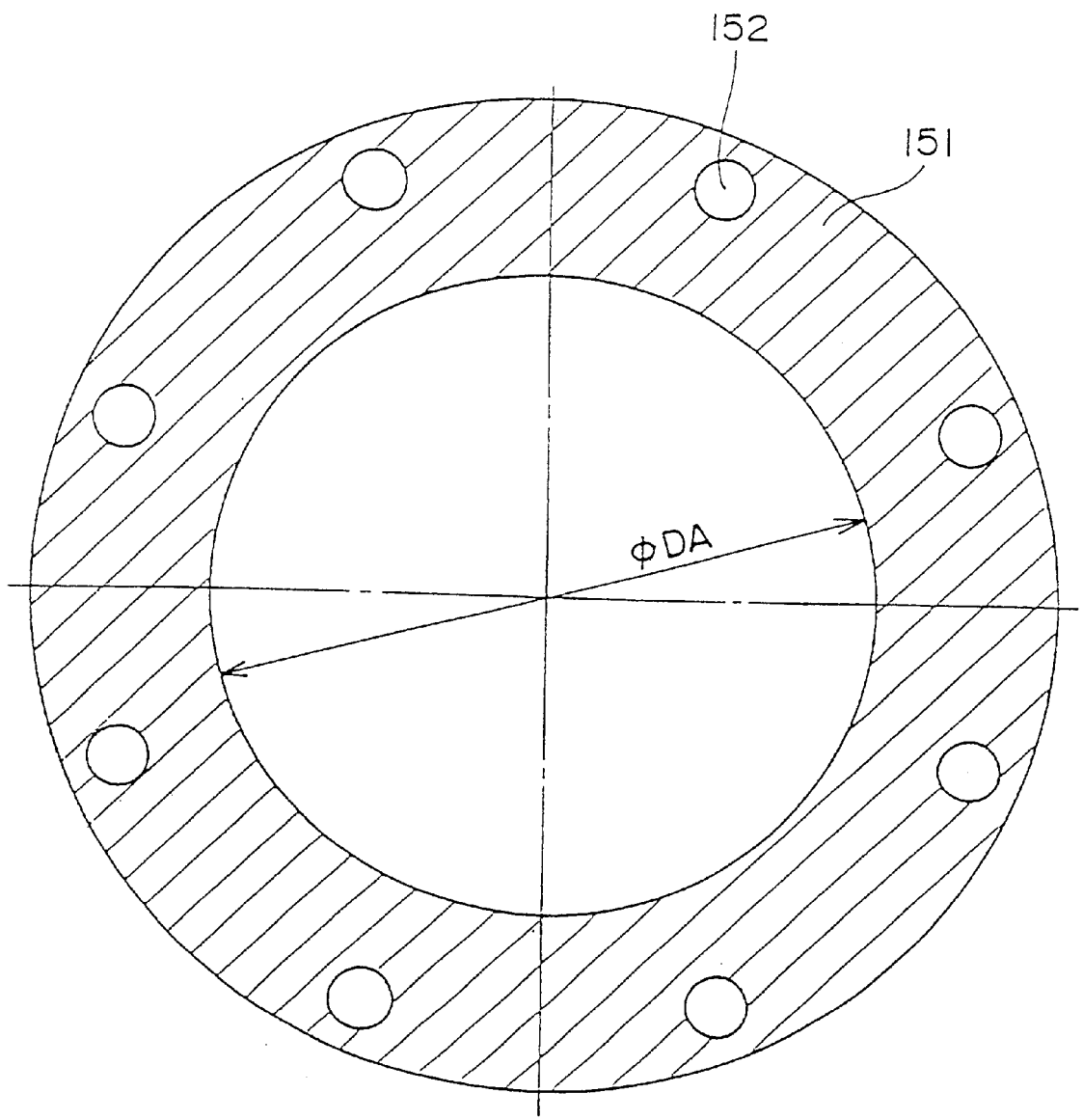
FIG. 1 is a plan view of a pin retaining ring base material, for use in describing the method of fabricating a pin retaining ring according to a first embodiment of the present invention.
Figure 2:
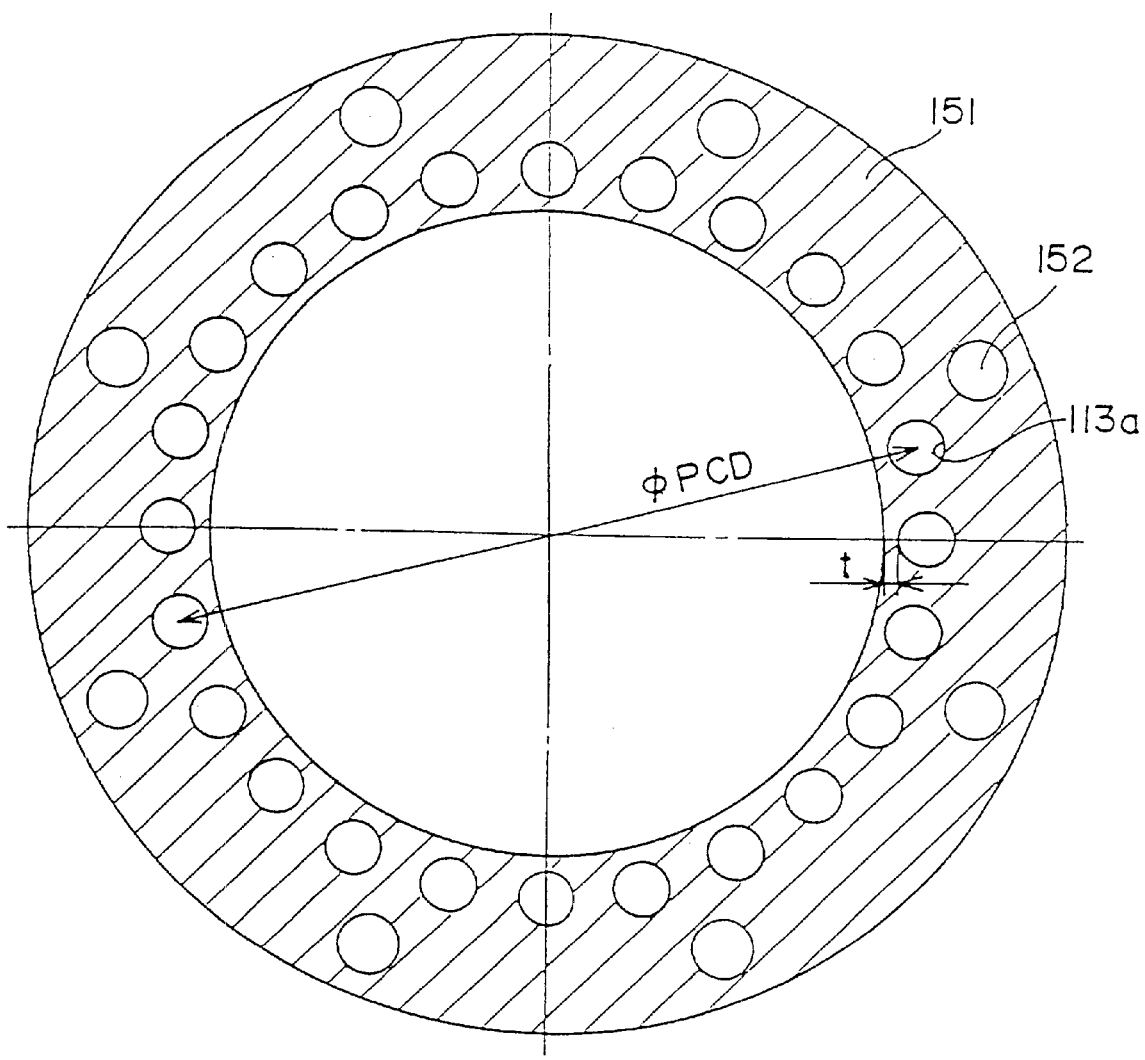
FIG. 2 is a plan view showing the pin retaining ring base material having pin retaining holes, or full round holes, formed therein.

In this fabrication method, at the first step, an appropriate number of bolt holes 152 are made in a pin retaining ring base material 151, as shown in FIG. 1. Then, as shown in FIG. 2, a number of pin retaining holes 113a are cut as full round holes on the pitch circle (a circle having a diameter of φPCD) with a drill or the like. The drilling is preferably followed by reaming or fine boring. Here, the bore diameter φDA of the pin retaining ring base material 151 is set to be smaller than the finished diameter φDB (FIG. 5) so that a sufficient thickness t (2 mm or greater, for example) is secured even when the pin retaining holes 113a are made as full round holes. In extreme cases, a pin retaining ring base material having no hole at the center (the bore diameter φDA=0) may be used.

Figure 3:
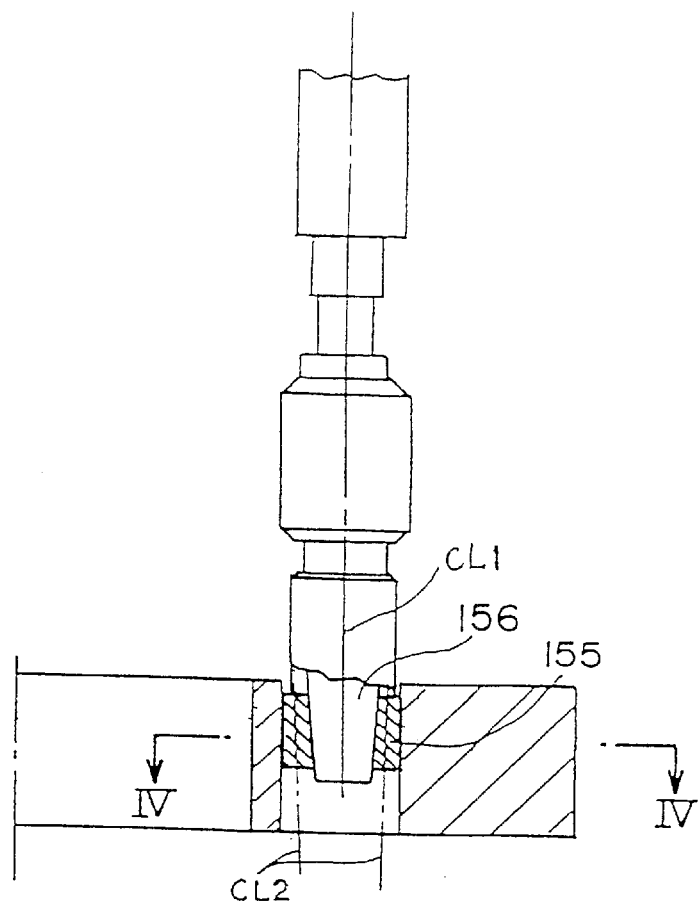
FIG. 3 is a sectional side view showing roller burnishing being applied to a pin retaining hole drilled as the full round hole.
Figure 4:
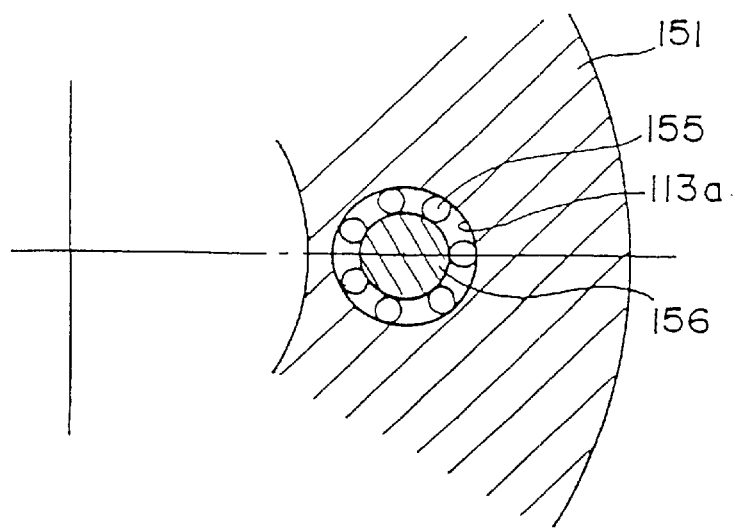
FIG. 4 is a sectional view taken along the arrowed line IV—IV of FIG. 3.

At the next step, the inner surface of each of the pin retaining holes 113a formed as full round holes is finished by roller burnishing, as shown in FIGS. 3 and 4. To be more specific, tapered compaction rollers 115 having a smooth surface are pressed into a pin retaining hole 113a by a tapered mandrel 156, and rotated in that state. This applies pressures beyond the yield point of the material to the inner surface of the pin retaining hole 113a, so that the inner surface of the pin retaining hole 113a undergoes plastic deformation and work hardening to be plastically worked into a smooth finished surface.

Here, the mandrel 156 and the compaction rollers 155 are tapered in the directions opposite to each other. Their respective shaft centers CL1 and CL2 are not parallel to each other, the shaft centers CL2 of the compaction rollers 155 being leaned slightly (so that the outermost lines of the compaction rollers 155 become parallel to the pin retaining hole 113).

Figure 5:
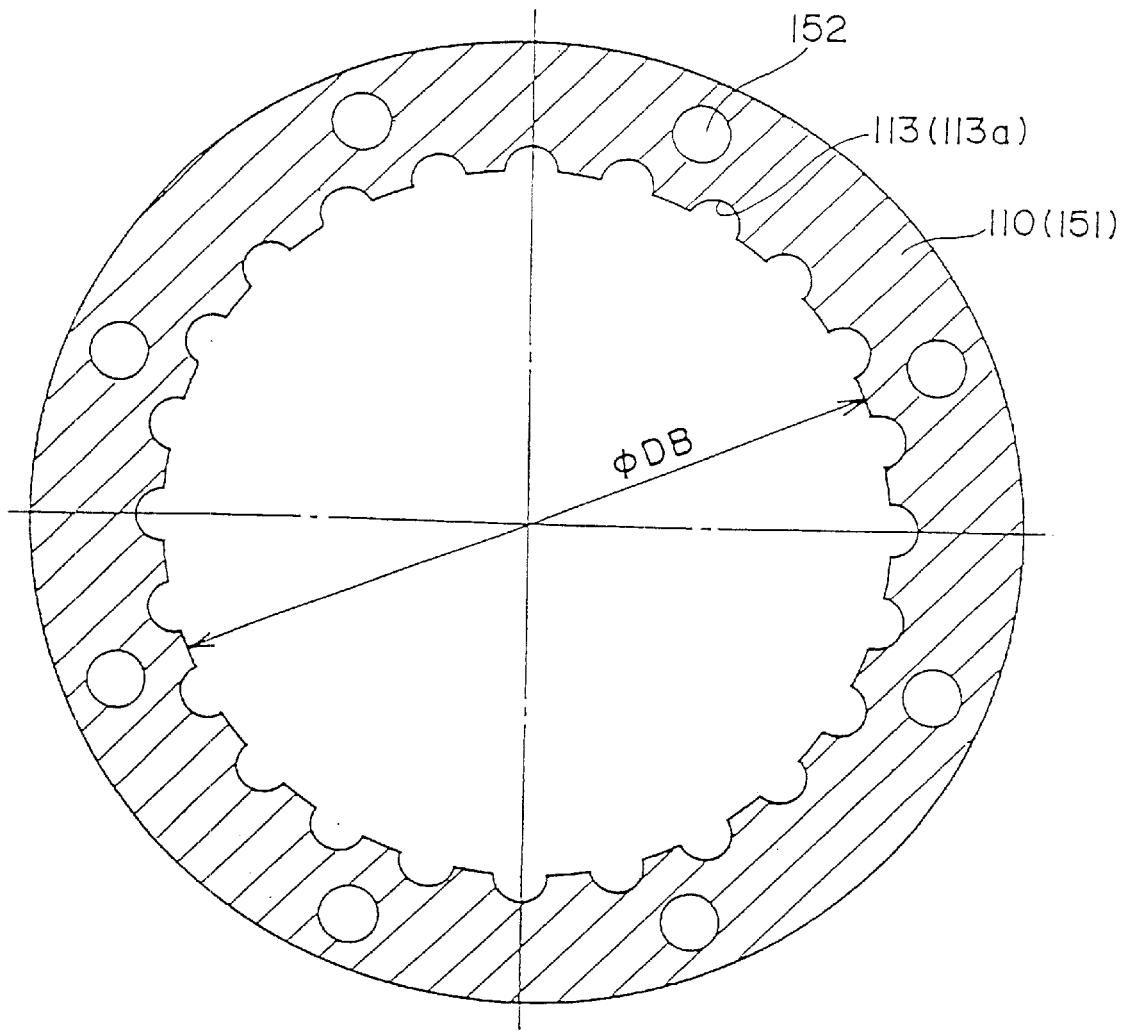
FIG. 5 is a plan view of a pin retaining ring having pin retaining holes of half-round shape, completed by expanding the bore diameter of the pin retaining ring base material.

Then, at the final step, the bore diameter of the pin retaining ring base material 151 is machined from φDA to the finished diameter φDB, as shown in FIG. 5. As a result, each of the pin retaining holes 113a whose inner surfaces are finished as full round holes is opened at the side closer to the ring inner periphery, whereby the pin retaining ring 110 having the pin retaining holes 113 of half-round shape is obtained.

Figure 6:
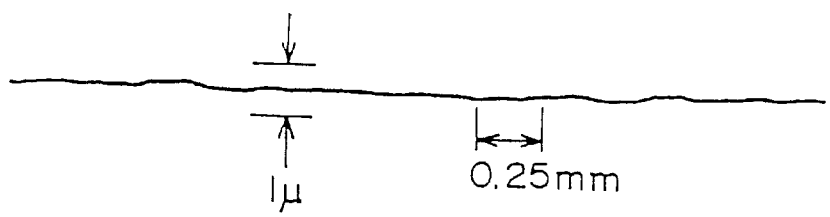
FIG. 6 is a diagram showing the circumferential surface roughness of a pin retaining hole obtained through the burnishing.

In this pin retaining ring 110, the inner surfaces of the roll-compacted pin retaining holes 113 can be easily set to 0.1–0.5 μm (or <0.1 μm) in circumferential surface roughness as shown in FIG. 6, with the half-round shapes of precise dimensions. Accordingly, this pin retaining ring 110, when incorporated to produce an internal meshing planetary gear mechanism as shown in FIGS. 17 and 18, can create a fluid lubrication state between the pins 11 and the pin retaining holes 113, thereby improving the sliding rotations of the pins 11.

As a result of this, it becomes possible to maintain excellent rolling contact with the external gears 5a, 5b; therefore, an internal meshing gear mechanism of higher efficiency, longer life, and lower noise can be obtained at lower costs.

Incidentally, the external gears 5a, 5b may adopt a circular arc tooth profile, aside from the trochoidal tooth profile.

Next, the fabrication method of the second embodiment will be described in conjunction with FIGS. 7 and 8.

Figure 7:
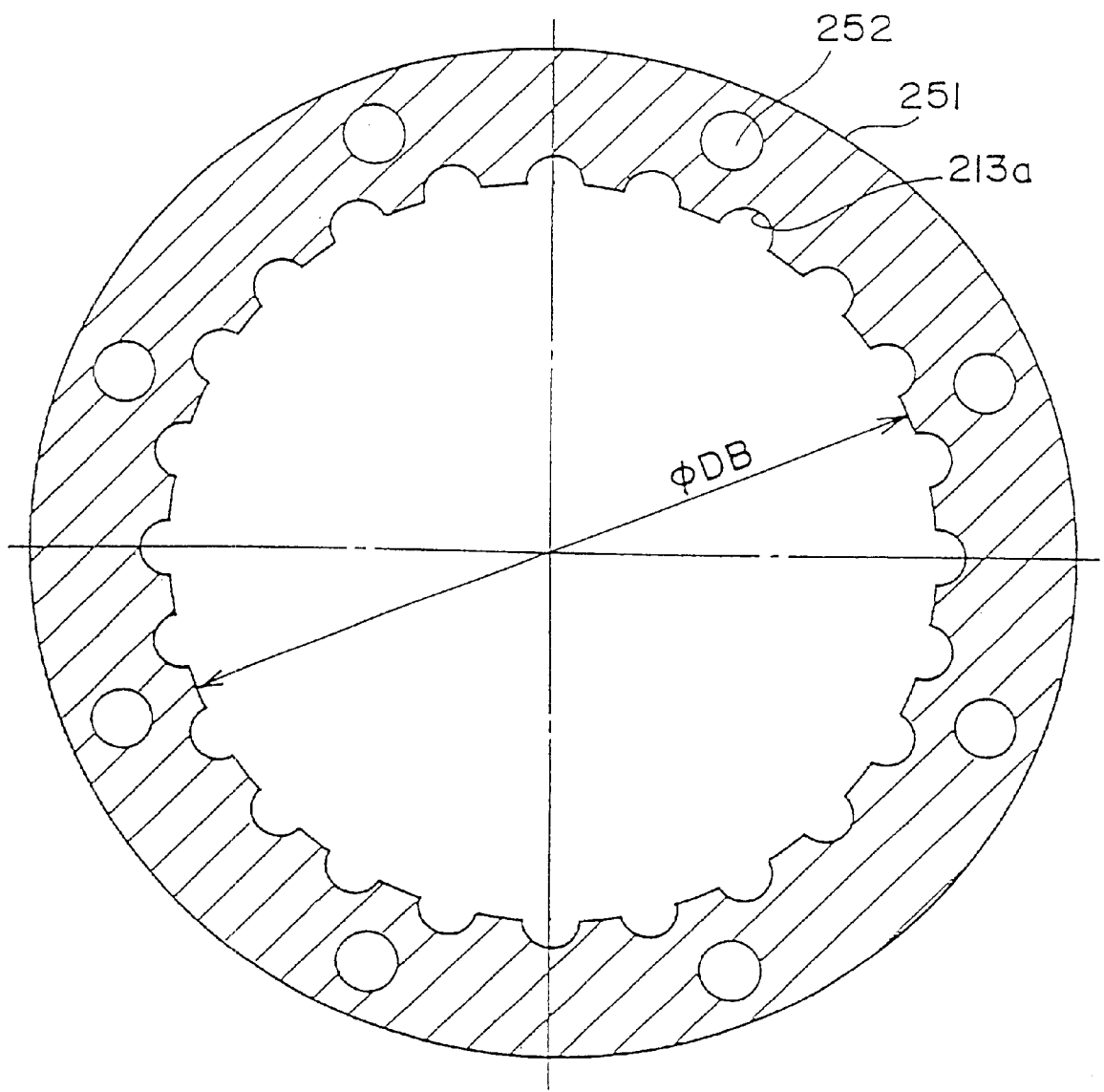
FIG. 7 is a plan view of a pin retaining ring base material after its machining, for use in describing the method of fabricating a pin retaining ring according to a second embodiment of the present invention.

In this fabrication method, at the first step, an appropriate number of bolt holes 252 are made in a pin retaining ring base material 251, and the bore diameter of the ring base material 251 is machined to a finished diameter φDB, as shown in FIG. 7. Into this pin retaining ring base material 251, pin retaining hole 213a of half-round shape are made by broaching, gear shaping, or grinding from the inner periphery of the pin retaining ring base material 251.

Figure 8:
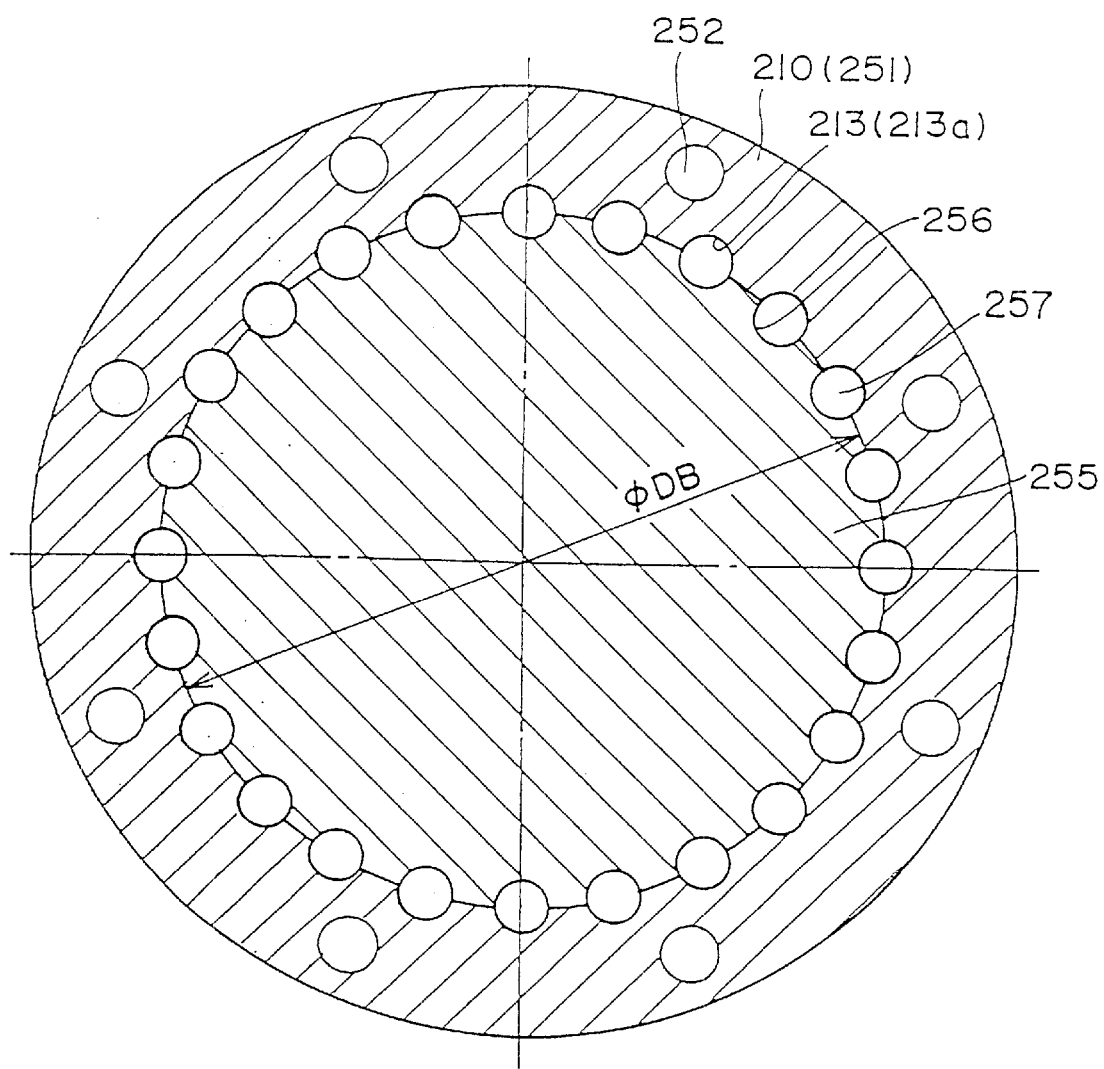
FIG. 8 is a plan view showing a circular guide being fitted to the inner periphery of the pin retaining ring so hat pin retaining holes of full round shape, capable of roller burnishing are formed.

At the next step, as shown in FIG. 8, a circular guide 255 is fitted to the inner periphery of the pin retaining ring base material 251. This guide 255 has half-round holes 256 corresponding to the pin retaining holes 213a, formed in its outer periphery. The half-round holes 256 formed in the outer periphery of the guide 255 and the half-round pin retaining holes 213a in the pin retaining ring base material 251 constitute full round holes 257.

Then, at the next step, the full round holes 257 formed by the coalescence of the guide 255 and the pin retaining ring base material 251 are subjected to the same roller burnishing as that of FIGS. 3 and 4, to finish the inner surfaces of the full round holes 257.

Then, upon the completion of the finish, the guide 255 is finally detached from the pin retaining ring base material 251 to obtain a pin retaining ring 210 having pin retaining holes 213 of half-round shape.

This method can also provide the pin retaining holes 213 of the same surface roughness and precise half-round dimensions as those of FIG. 6, thereby offering the same effect upon the incorporation to an internal meshing planetary gear mechanism.

Incidentally, phosphatic coating (chemical conversion coating) may be applied to the entire pin retaining ring 110, 210 made thus, or only the areas of the pin retaining holes 113, 213. The application roughens (deteriorates) the surface roughness slightly, but the nature of the phosphate allows greater retention of lubricating oil, which improves resistance to burning. Moreover, in the chemical conversion step, the smooth surfaces of the pin retaining holes 113, 213 eliminate the growth of phosphate on irregularities. As a result, the prevention of initial burning by thin coating becomes compatible with the securement of fluid lubrication through the improvement in surface roughness.

Now, description will be given of the cases where the present invention is applied to a hydraulic pump motor.

Figure 22:
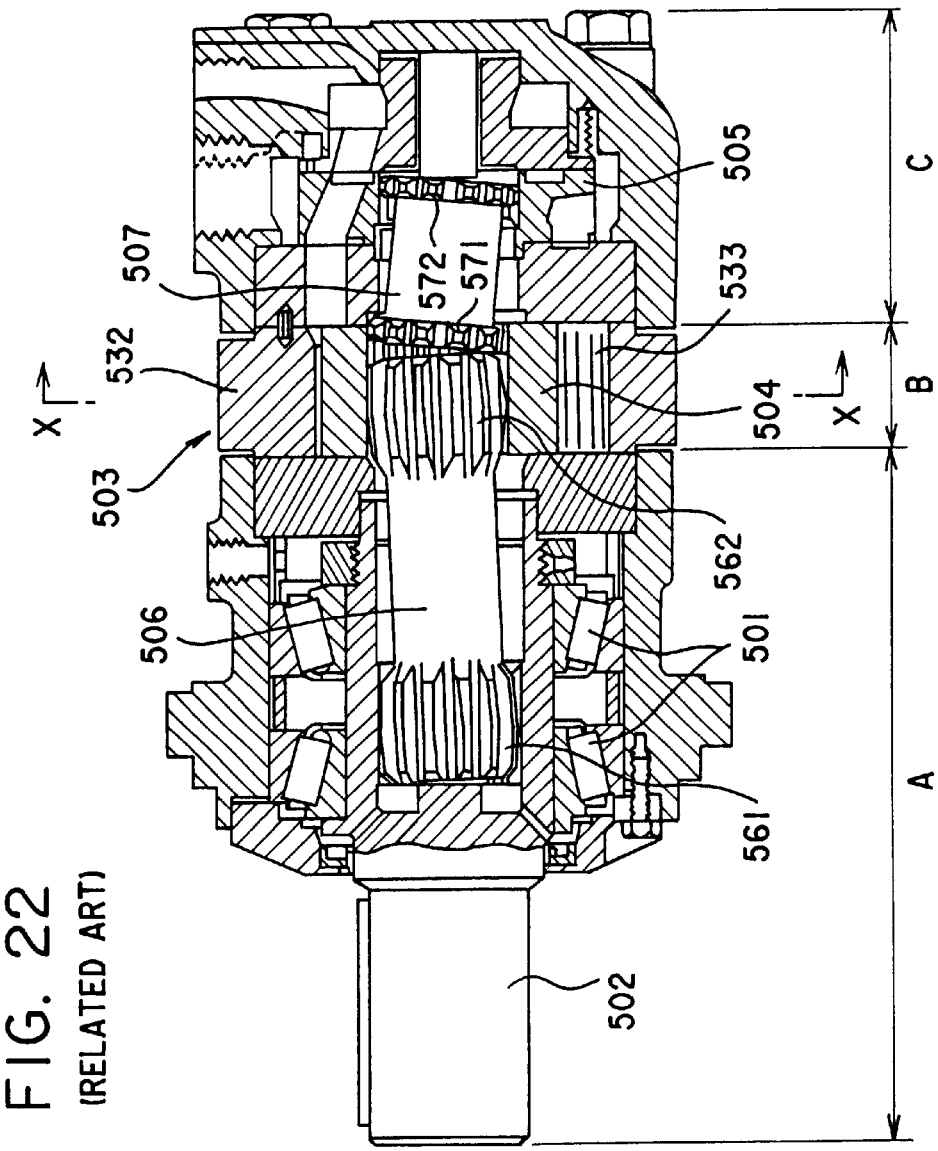
FIG. 22 is a sectional view of a trochoidal type hydraulic motor shown as a conventional example of the internal meshing gear motor pump in question.
Figure 23:
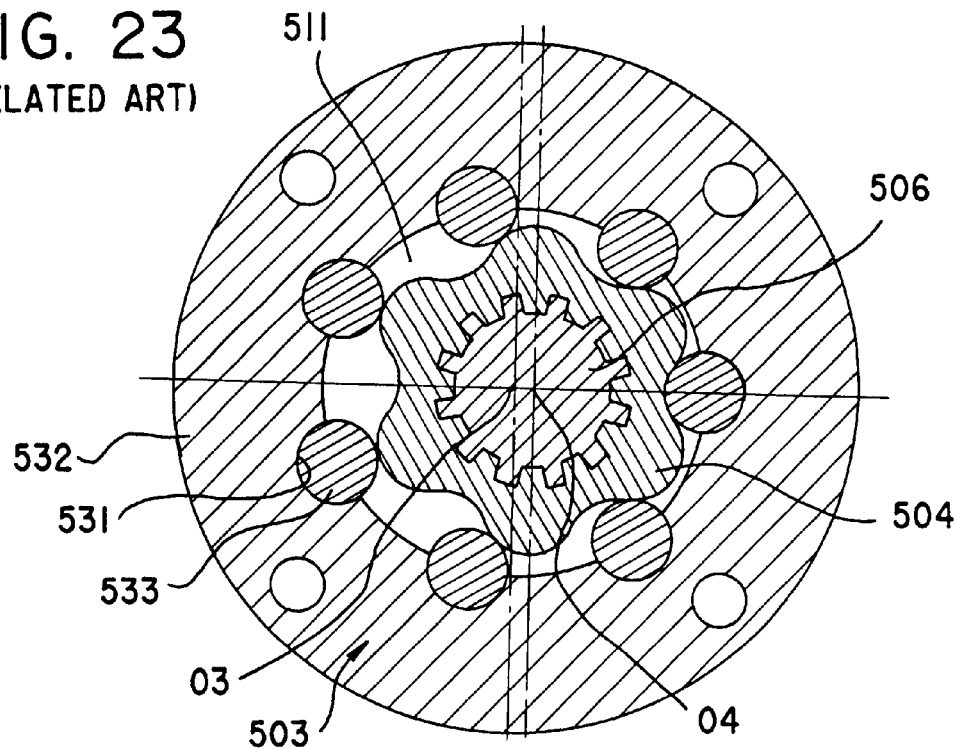
FIG. 23 is a sectional view taken along the arrowed line XXIII—XXIII of FIG. 22.

In appearance, the hydraulic pump motor of the third (fourth) embodiment has almost the same configuration as that shown in FIGS. 22 and 23, except in the detailed configuration of the roller retaining ring 532 constituting the internal gear 503 and the method of fabricating the same. Thus, the description of the third (fourth) embodiment will be first directed to the method of fabricating a roller retaining ring 632, 732 (the roller retaining ring of the present embodiment is designated by the reference numeral having the lower two digits identical to those of the reference numeral of the conventional pin retaining ring shown in FIGS. 22 and 23).

Generally speaking, in a hydraulic motor pump of this type, the meshing portions and the sliding contact surfaces need to be made of high strength members with high precision. Therefore, the roller retaining ring 632, 732 of the internal gear is generally fabricated of spheroidal graphite cast iron defined in JIS G5502, carbon steel for machine structural use defined in JIS G4501, or shaped articles of iron type sintered metal.

The fabrication method of the third embodiment will be described in conjunction with FIGS. 9–13.

Figure 9:
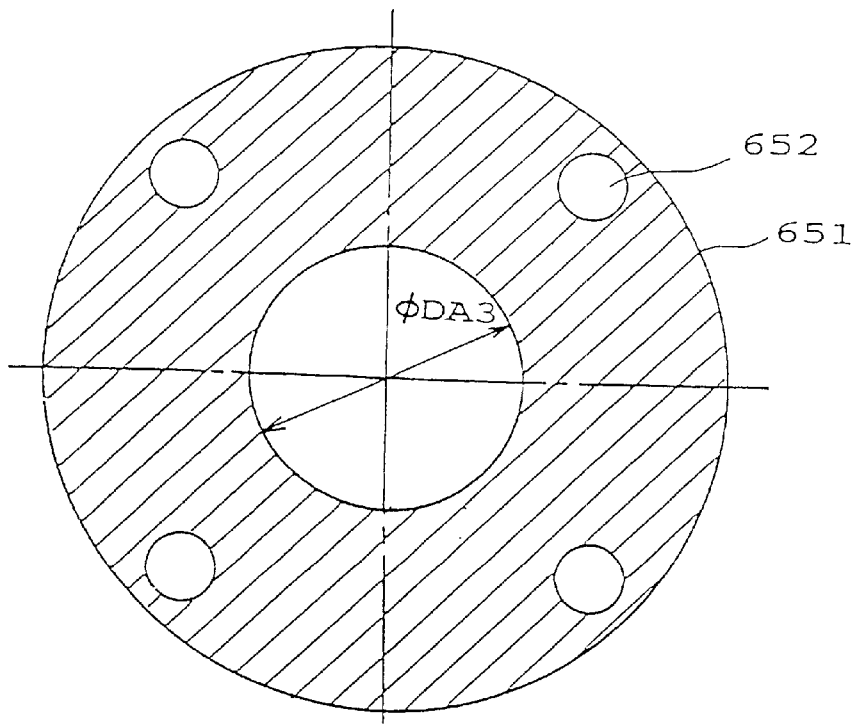
FIG. 9 is a plan view of a roller retaining ring base material, for use in describing the method of fabricating a roller retaining ring according to a third embodiment of the present invention.
Figure 10:
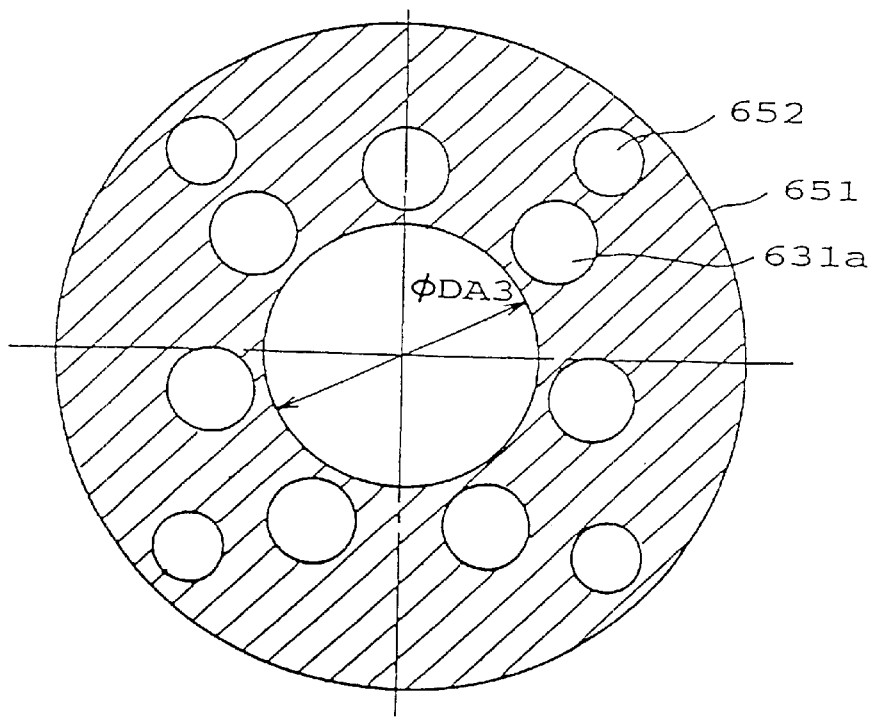
FIG. 10 is a plan view showing the roller retaining ring base material having roller retaining holes, or full round holes, formed therein.
Figure 13:
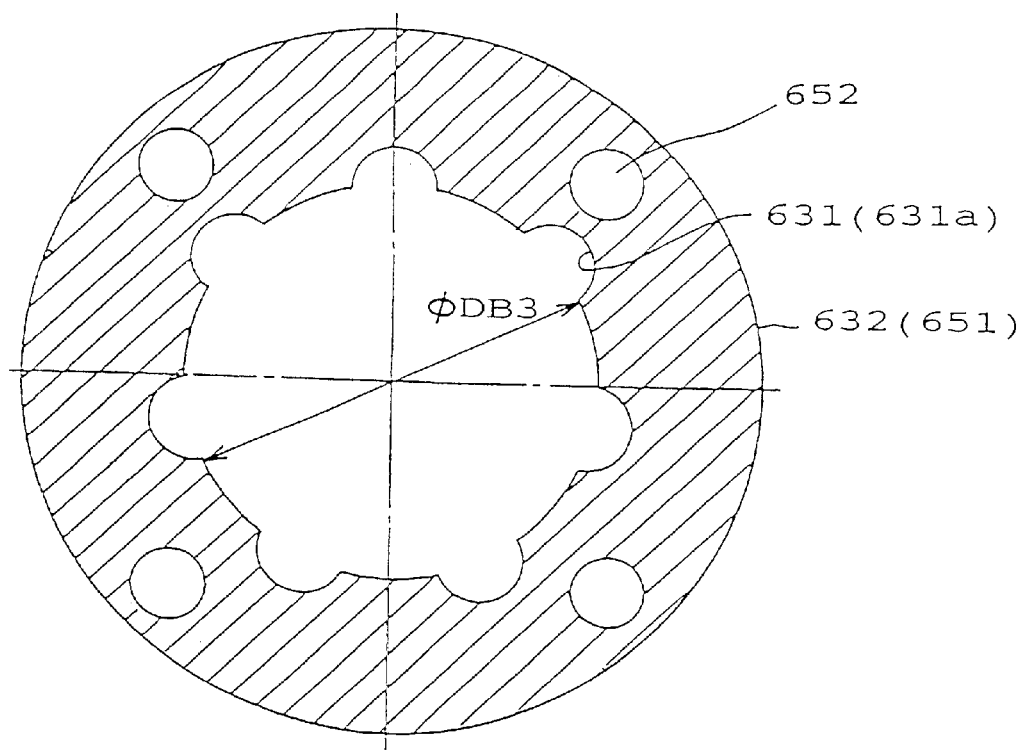
FIG. 13 is a plan view of a roller retaining ring having roller retaining holes of half-round shape, completed by expanding the bore diameter of the roller retaining ring base material mentioned above.

In this fabrication method, at the first step, an appropriate number of bolt holes 652 are made in a roller retaining ring base material 651 as shown in FIG. 9. Here, the bore diameter $\phi DA3$ of the roller retaining ring base material 651 is set to be smaller than a finished diameter $\phi DB3$ (FIG. 13). In extreme cases, there may be prepared a roller retaining ring base material having no hole at the center (the bore diameter $\phi DA3=0$). Then, as shown in FIG. 10, roller retaining holes 631a are cut in the form of full round holes into this roller retaining ring base material 651 with a drill or the like. Here, the drilling is preferably followed by reaming or fine boring.

Figure 11:
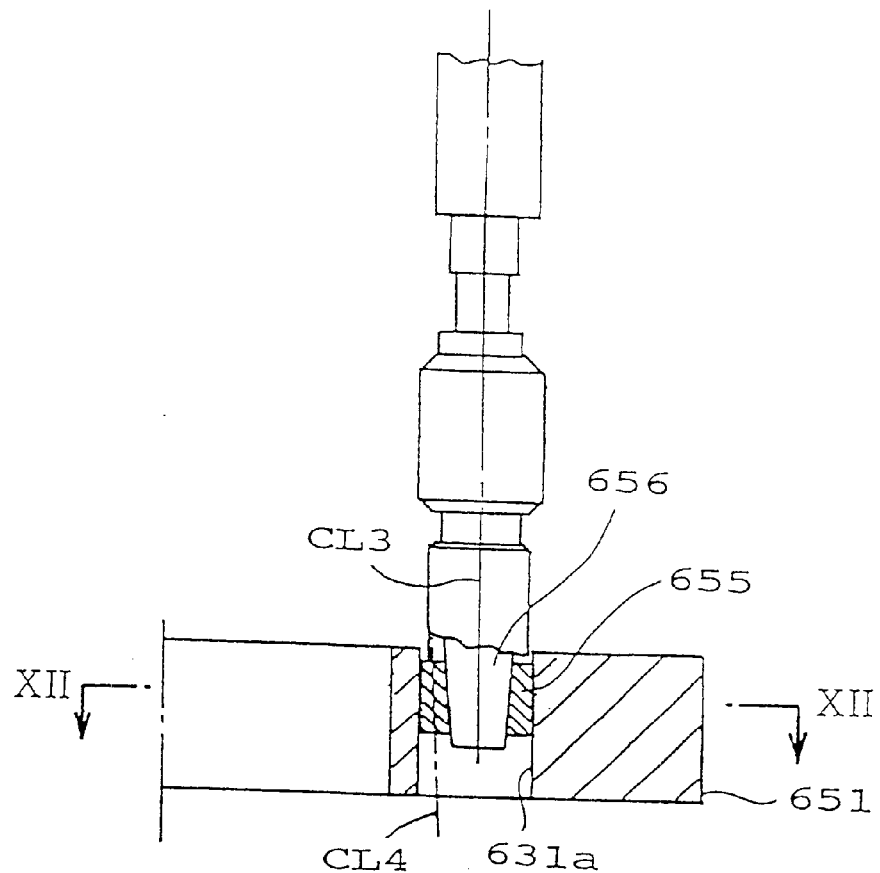
FIG. 11 is a sectional side view showing roller burnishing being applied to a roller retaining hole drilled as the full round hole.
Figure 12:
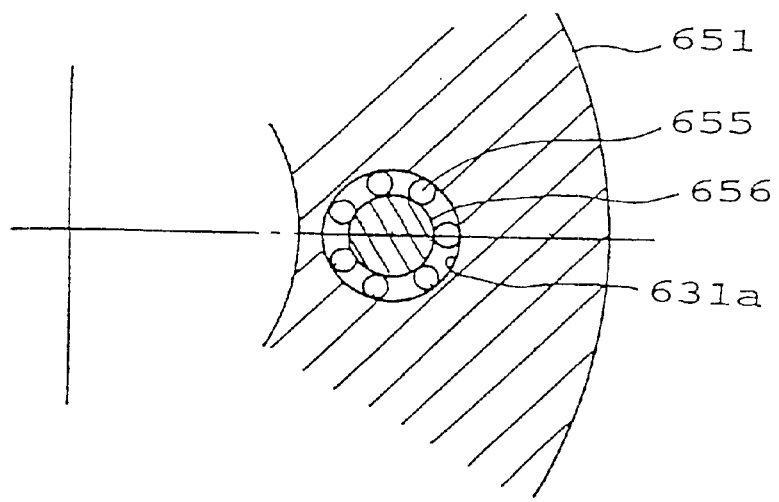
FIG. 12 is a sectional view taken along the arrowed line XII—XII of FIG. 11.

At the next step, the inner surface of each of the roller retaining holes 631a formed as full round holes is finished by roller burnishing, as shown in FIGS. 11 and 12. To be more specific, tapered compaction rollers 655 having a smooth surface are pressed into a roller retaining hole 631a by a tapered mandrel 656, and rotated in that state. This applies pressures beyond the yield point of the material to the inner surface of the roller retaining hole 631a so that the inner surface of the roller retaining hole 631a undergoes plastic deformation and work hardening to be plastically worked into a smooth finished surface.

Here, the mandrel 656 and the compaction rollers 655 are tapered in the directions opposite to each other. Their respective shaft centers CL3 and CL4 are not parallel to each other, the shaft centers CL4 of the compaction rollers 655 being leaned slightly (so that the outermost lines of the compaction rollers 655 become parallel to the roller retaining hole 631a).

Then, at the final step, the bore diameter of the roller retaining ring base material 651 is expanded from $\phi DA3$ to the finished diameter $\phi DB3$, as shown in FIG. 13. As a result, each of the roller retaining holes 631a whose inner surfaces are finished as full round holes is opened at the side closer to the ring inner periphery, whereby a roller retaining ring 632 having roller retaining holes 631 of half-round shape is obtained.

Figure 14:
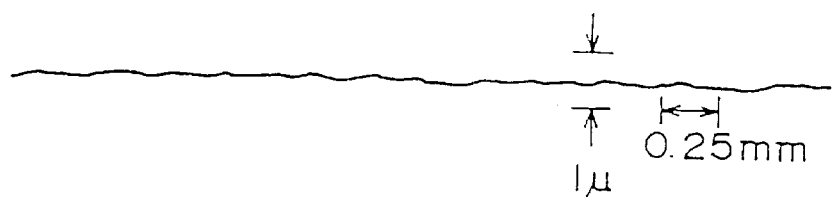
FIG. 14 is a diagram showing the circumferential surface roughness of a roller retaining hole obtained through the burnishing.

In this pin retaining ring 632, the inner surfaces of the roll-compacted roller retaining holes 631 can be easily set to 0.1–0.5 $\mu$m in circumferential surface roughness as shown in FIG. 14, with the half-round shapes of precise dimensions. Accordingly, this roller retaining ring 632, when incorporated to produce an internal meshing gear motor pump as shown in FIGS. 22 and 23, can create a fluid lubrication state between the rollers 533 and the roller retaining holes 631, thereby improving the sliding rotations of the rollers 533. As a result of this, it becomes possible to maintain excellent rolling contact with the external gear 504; therefore, an internal meshing gear motor pump of higher efficiency, longer life, and lower noise can be obtained at lower costs.

Incidentally, the external gear 504 may adopt a circular arc tooth profile, aside from the trochoidal tooth profile.

Next, the fabrication method of the fourth embodiment will be described in conjunction with FIGS. 15 and 16.

Figure 15:
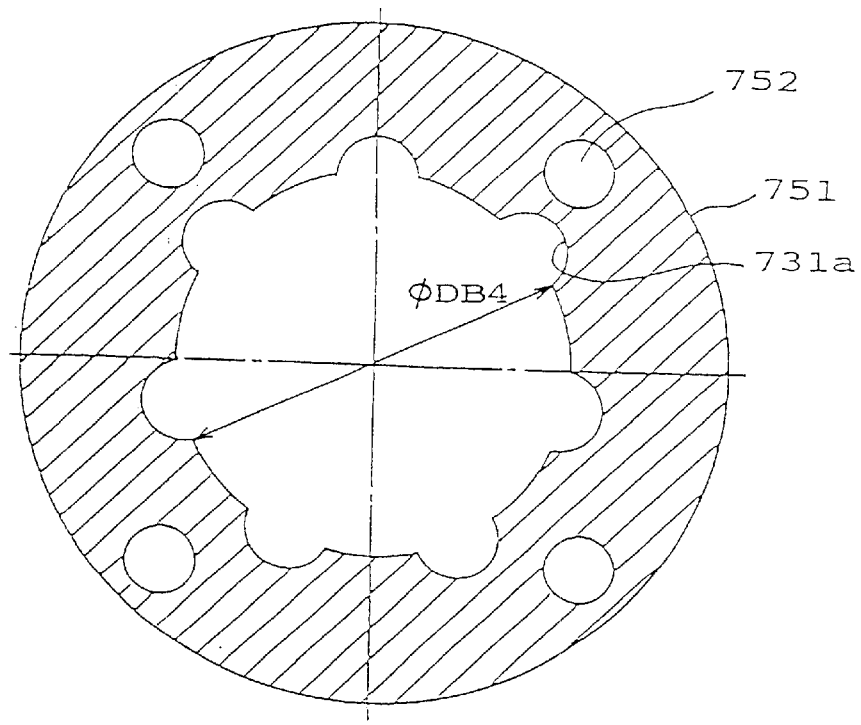
FIG. 15 is a plan view of a roller retaining ring after its machining, for use in describing the method of fabricating a roller retaining ring according to a fourth embodiment of the present invention.
Figure 24:
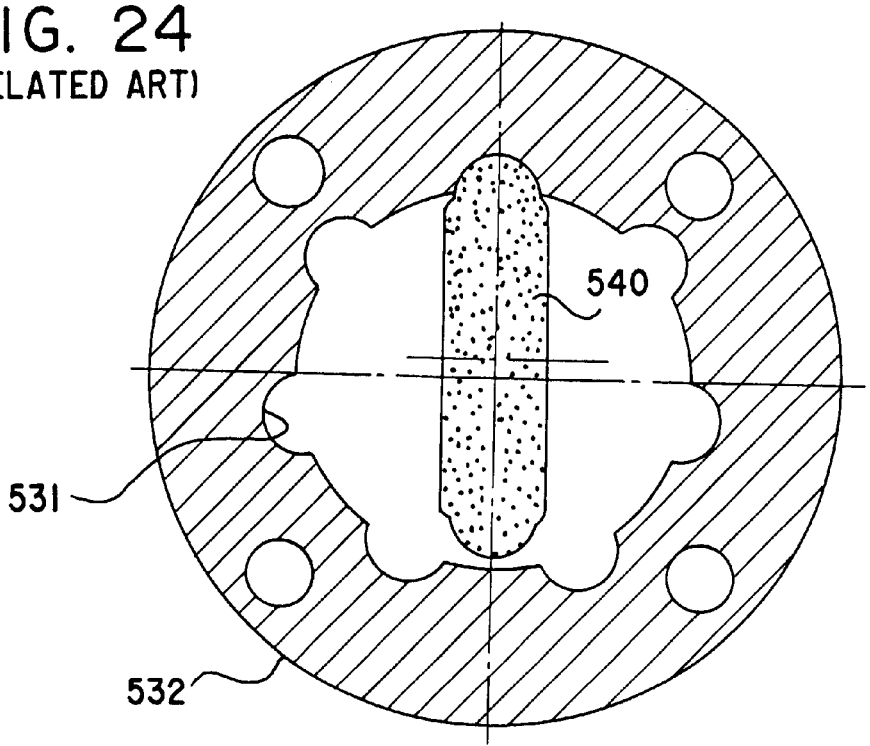
FIG. 24 is an explanatory diagram of a conventional method for machining roller retaining holes.
Figure 25:
FIG. 25 is a diagram showing the circumferential surface roughness of a conventional roller retaining hole after broaching.
Figure 26:
FIG. 26 is a diagram showing the circumferential surface roughness of- a conventional roller retaining hole after grinding.

In this fabrication method, at the first step, an appropriate number of bolt holes 752 are made in a roller retaining ring base material 751, and the bore diameter of the ring base material 751 is machined to a finished diameter $\phi DB4$, as shown in FIG. 15. Into this roller retaining ring base material 751, roller retaining hole 731a of half-round shape are cut by broaching, gear shaping, or grinding from the inner periphery of the roller retaining ring base material 751 (see FIG. 24, for example).

Figure 16:
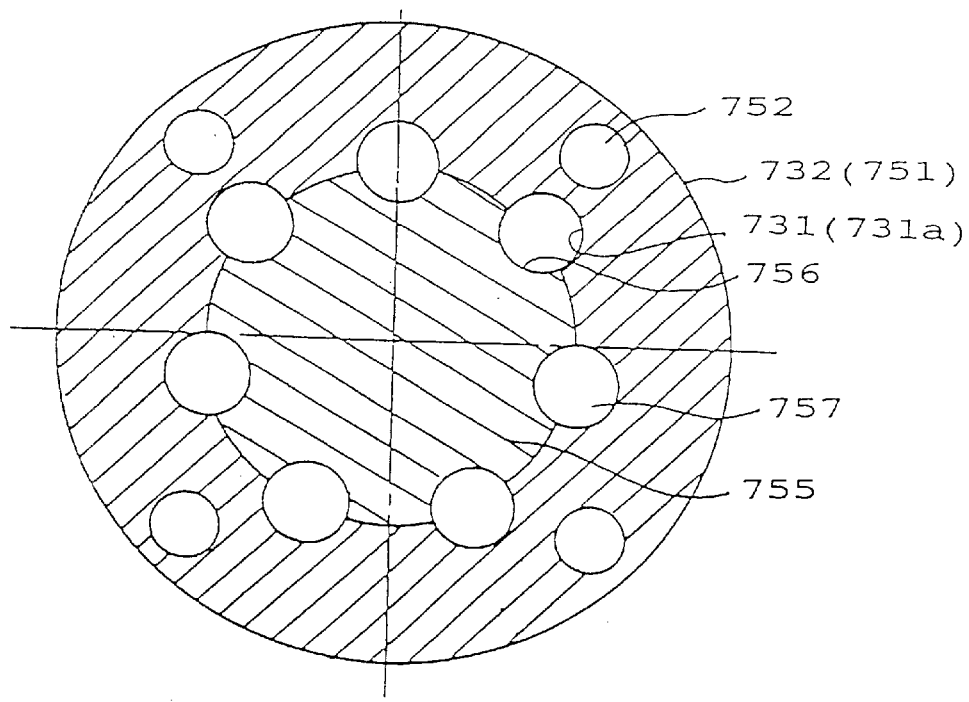
FIG. 16 is a plan view showing a circular guide being fitted to the inner periphery of the roller retaining ring so that roller retaining holes of full round shape, capable of roller burnishing are formed.

At the next step, as shown in FIG. 16, a circular guide 755 is fitted to the inner periphery of the roller retaining ring base material 751. This guide 755 has half-round holes 756 corresponding to the roller retaining holes 731a, formed in its outer periphery. The half-round holes 756 formed in the outer periphery of the guide 755 and the half-round roller retaining holes 731a in the roller retaining ring base material 751 constitute full round holes 757.

Then, at the next step, the full round holes 757 formed by the coalescence of the guide 755 and the roller retaining ring base material 751 are subjected to the same roller burnishing as that of FIGS. 11 and 12, to finish the inner surfaces of the full round holes 757.

Then, upon the completion of the finish, the guide 755 is finally detached from the roller retaining ring base material 751 to obtain a roller retaining ring 732 having roller retaining holes 731 of half-round shape.

This method can also provide the roller retaining holes 731 of the same surface roughness and precise half-round dimensions as those of FIG. 14, thereby offering the same effect upon the incorporation to an internal meshing gear motor pump.

Incidentally, as in the first and second embodiments described before, phosphatic coating (chemical conversion coating) may be applied to the entire roller retaining ring 632, 732 made thus, or only the areas of the roller retaining holes 631, 731. The application roughens (deteriorates) the surface roughness slightly, but the nature of the phosphate allows greater retention of lubricating oil, which improves resistance to burning. Moreover, in the chemical conversion step, the smooth surfaces of the roller retaining holes 631, 731 eliminate the growth of phosphate on irregularities. Therefore, the prevention of initial burning by thin coating becomes compatible with the securement of fluid lubrication through the improvement in surface roughness.

INDUSTRIAL APPLICABILITY

As has been described above, the method of fabricating an internal gear according to the present invention is particularly suitably applied to internal meshing planetary gearing, or a hydraulic motor pump having an internal meshing planetary gear mechanism.

What is claimed is:

1. A method of fabricating a pin retaining ring for an internal gear in an internal meshing gear mechanism, said internal meshing gear mechanism having said internal gear and an external gear put into internal mesh with said internal gear, said internal gear consisting of said pin retaining ring having a plurality of axially-extending pin retaining holes of half-round shape in its inner periphery and pins rotatably fitted to said respective pin retaining holes, said pins forming circular arc teeth with the portions exposed from said pin retaining holes, said external gear having teeth corresponding to said circular arc teeth, said method being characterized in comprising the steps of:

cutting said pin retaining holes; and plastically finishing the inner surfaces of said pin retaining holes by roller burnishing.

2. A method of fabricating a pin retaining ring for an internal gear in an internal meshing gear mechanism, said internal meshing gear mechanism having said internal gear and an external gear put into internal mesh with said internal gear, said internal gear consisting of said pin retaining ring having a plurality of axially-extending pin retaining holes of half-round shape in its inner periphery and pins rotatably fitted to said respective pin retaining holes, said pins forming circular arc teeth with the portions exposed from said pin retaining holes, said external gear having teeth corresponding to said circular arc teeth, said method being characterized in comprising the steps of:

cutting said pin retaining holes as full round holes into a pin retaining ring base material having such a bore diameter as to include said pin retaining holes in the form of full round holes; after said cutting step, plastically finishing the inner surfaces of said respective pin retaining holes by roller burnishing; and after the plastic finishing step, expanding the bore diameter of said pin retaining ring base material to a finished diameter so that said respective pin retaining holes having their inner surfaces finished as the full round holes are opened at the portions closer to the ring inner periphery to form said pin retaining holes of half-round shape.

3. A method of fabricating a pin retaining ring for an internal gear in an internal meshing gear mechanism, said internal meshing gear mechanism having said internal gear and an external gear put into internal mesh with said internal gear, said internal gear consisting of said pin retaining ring having a plurality of axially-extending pin retaining holes of half-round shape in its inner periphery and pins rotatably fitted to said respective pin retaining holes, said pins forming circular arc teeth with the portions exposed from said pin retaining holes, said external gear having teeth corresponding to said circular arc teeth, said method being characterized in comprising the steps of:

cutting opening pin retaining holes of half-round shape into the inner periphery of said pin retaining ring; after the cutting step, fitting a circular guide having half-round holes corresponding to said pin retaining holes formed in its outer periphery to the inner periphery of said pin retaining ring so that the half-round holes formed in the outer periphery of said guide and said half-round pin retaining holes in said pin retaining ring constitute full round holes; after the guide fitting step, plastically finishing by roller burnishing the inner surfaces of said full round holes formed by the coalescence of said guide and said pin retaining ring; and after the plastic finishing step, detaching said guide from said pin retaining ring.

4. The method of fabricating a pin retaining ring for an internal gear in an internal meshing gear mechanism according to any of claims 1 to 3, characterized in further comprising the step of:

applying chemical conversion coating to the inner surfaces of said pin retaining holes after the completion of the plastic finishing to said pin retaining ring.

5. A method of fabricating a roller retaining ring of a hydraulic motor pump, said hydraulic motor pump having an internal gear and an external gear put into internal mesh with said internal gear, said internal gear consisting of said roller retaining ring having a plurality of axially-extending roller retaining holes of half-round shape in its inner periphery and rollers rotatably fitted to said respective roller retaining holes, said rollers forming circular arc teeth with the portions exposed from said roller retaining holes, said external gears having teeth corresponding to said circular arc teeth, said hydraulic motor pump utilizing a change in the volume of a space formed between both teeth to obtain its motor function or pump function, said method being characterized in comprising the steps of:

cutting said roller retaining holes; and plastically finishing the inner surfaces of said roller retaining holes by roller burnishing.

6. A method of fabricating a roller retaining ring of a hydraulic motor pump, said hydraulic motor pump having an internal gear and an external gear put into internal mesh with said internal gear, said internal gear consisting of said roller retaining ring having a plurality of axially-extending roller retaining holes of half-round shape in its inner periphery and rollers rotatably fitted to said respective roller retaining holes, said rollers forming circular arc teeth with the portions exposed from said roller retaining holes, said external gears having teeth corresponding to said circular arc teeth, said hydraulic motor pump utilizing a change in the volume of a space formed between both teeth to obtain its motor function or pump function, said method being characterized in comprising the steps of:

cutting said roller retaining holes as full round holes into a roller retaining ring base material having such a bore diameter as to include said roller retaining holes in the form of full round holes; after the cutting step, plastically finishing the inner surfaces of said respective roller retaining holes by roller burnishing; and after the plastic finishing step, expanding the bore diameter of said roller retaining roller base material to a finished diameter so that said respective roller retaining holes having their inner surfaces finished as the full round holes are opened at the portions closer to the ring inner periphery to form said roller retaining holes of half-round shape.

7. A method of fabricating a roller retaining ring of a hydraulic motor pump, said hydraulic motor pump having an internal gear and an external gear put into internal mesh with said internal gear, said internal gear consisting of said roller retaining ring having a plurality of axially-extending roller retaining holes of half-round shape in its inner periphery and rollers rotatably fitted to said respective roller retaining holes, said rollers forming circular arc teeth with the portions exposed from said roller retaining holes, said external gears having teeth corresponding to said circular arc teeth, said hydraulic motor pump utilizing a change in the volume of a space formed between both teeth to obtain its motor function or pump function, said method being characterized in comprising the steps of:

cutting opening roller retaining holes of half-round shape into the inner periphery of said roller retaining ring; after the cutting step, fitting a circular guide having half-round holes corresponding to said roller retaining holes formed in its outer periphery to the inner periphery of said roller retaining ring so that the half-round holes formed in the outer periphery of said guide and said half-round roller retaining holes in said roller retaining ring constitute full round holes; after the guide fitting step, plastically finishing by roller burnishing the inner surfaces of said full round holes formed by the coalescence of said guide and said roller retaining ring; and after the plastic finishing step, detaching said guide from said roller retaining ring.

8. The method of fabricating a roller retaining ring of a hydraulic motor pump according to any of claims 5 to 7, characterized in further comprising the step of:

applying chemical conversion coating to the inner surfaces of said roller retaining holes after the completion of the roller burnishing to said roller retaining ring.

9. Internal meshing gearing having an internal gear and an external gear put into internal mesh with said internal gear, said internal gear consisting of a pin retaining ring having a plurality of axially-extending pin retaining holes of half-round shape in its inner periphery and pins rotatably fitted to said respective pin retaining holes, said pins forming circular arc teeth with the portions exposed from said pin retaining holes, said external gears having teeth corresponding to said circular arc teeth, said gearing being characterized in that:

said pin retaining ring for said internal gear is obtained by cutting said pin retaining holes and plastically finishing the inner surfaces of said cut pin retaining holes by roller burnishing.

10. A hydraulic motor pump having an internal gear and an external gear put into internal meshing with said internal gear, said internal gear comprising a pin retaining ring having a plurality of axially-extending pin retaining holes of half-round shape in its inner periphery and pins rotatably fitted to said respective pin retaining holes, said pins forming circular arc teeth with the portions exposed from said pin retaining holes, said external gears having teeth corresponding to said circular arc teeth, said hydraulic motor pump utilizing a change in the volume of a space formed between both teeth to obtain its motor function or pump function, said hydraulic motor pump being characterized in that:

said pin retaining ring for said inner gear is obtained by cutting said pin retaining holes and plastically finishing the inner surfaces of said cut pin retaining holes by roller burnishing.

* * * * *